Patented Sept. 26, 1922.

1,430,083

UNITED STATES PATENT OFFICE.

ALBERT C. HOLZAPFEL, OF NEW YORK, N. Y.

COATING COMPOSITION.

No Drawing.   Application filed June 15, 1922.   Serial No. 568,638.

*To all whom it may concern:*

Be it known that I, ALBERT C. HOLZAPFEL, a citizen of the United States, residing at New York, in the county of New York and State of New York, have invented certain new and useful Improvements in Coating Compositions, of which the following is a specification.

This invention relates to surface coating compositions, and more particularly to paints containing stearine pitch, or pitch derived from the treatment of similar oils and fats.

An object of the invention is the provision of a paint having an improved appearance, and increased power of resistance.

In a prior Patent No. 1,379,018, granted to me under date of May 24, 1921, I have described and claimed a surface coating composition consisting of pitch derived from the treatment of oils and fats, tar oil, a pigment, and a paint oil. In other patents, I have described and claimed other compositions of this character in which pitch derived from the treatment of oils and fats is a material ingredient. I have found that the addition of a small quantity of solution of rubber, or similar gums, produces a paint having an improved appearance and also increases the resisting power of the paint. While the proportion of rubber employed may be varied within wide limits, I have found that the addition of a rubber solution containing about .5 to 1 per cent. of rubber by weight of the total content of the paint is most suitable. In addition to rubber, cumarone resin which is a synthetic gum, or cumarin gum which is a composition of similar nature, may be employed.

The composition of the paint to which the rubber solution is added may vary within wide limits but as an example, the composition disclosed in my Patent No. 1,379,018 consisting of from 30 to 40 parts by weight of stearine pitch or the residue derived from the treatment of similar oils and fats, to 60 or 70 parts by weight of tar oil, such as a distillate of tar and or petroleum spirit of from 70° to 100° flash point, or other hydrocarbon solvent of the pitch may be employed. A suitable pigment is, of course, incorporated with this material, preferably in the proportions of 10 to 30 parts by weight, and a small proportion of linseed oil or other paint oil may be added. In place of part of the stearine pitch, cumar gum may be used.

The rubber is added to the stearine pitch and cumarone resin varnish during the process of manufacture. While the proportion of rubber added may vary within wide limits, I find that the addition of about ½ to 1 per cent. of rubber by weight of the total content of the paint is preferable. In addition to rubber, various other gums may be employed, and I find that cumarone resin is very suitable for this purpose. In producing light shades of paint made on the bases of a varnish containing a substantial proportion of stearine pitch or other pitch derived from the treatment of oils and fats, I find an oxide of antimony may be used in place of titanium oxide or other pigment, and may be added in substantially the same proportions as the proportion of such pigments.

While I have described in detail the preferred practice of my process, it is to be understood that the details of procedure, and proportions of ingredients may be widely varied, and that known chemical equivalents may be employed in place of the materials mentioned, without departing from the spirit of the invention or the scope of the subjoined claims.

Having thus described my invention, I claim:

1. A surface coating composition comprising stearine pitch, a solvent therefor, and substantially 1 per cent. of rubber.

2. A surface coating composition comprising pitch derived from the treatment of oils and fats, a solvent for said pitch, and from ½ to 2 per cent. by weight of rubber.

In testimony whereof, I affix my signature in presence of two witnesses.

ALBERT C. HOLZAPFEL.

Witnesses:
WILLIAM MARTIN,
H. E. TEHAN.